United States Patent [19]

Everett et al.

[11] Patent Number: 5,376,182
[45] Date of Patent: Dec. 27, 1994

[54] SURFACTANT SOIL REMEDIATION

[75] Inventors: Lorne G. Everett, Santa Barbara; Stephen C. Havlicek, Camarillo; John Akiskalian, Santa Barbara, all of Calif.

[73] Assignee: Remsol (U.S.A.) Corporation, Santa Barbara, Calif.

[21] Appl. No.: 35,529

[22] Filed: Mar. 17, 1993

[51] Int. Cl.$^5$ .................. B08B 3/08; B08B 3/12; B08B 7/00; B01D 11/04
[52] U.S. Cl. ..................... 134/25.1; 134/10; 134/1; 134/42
[58] Field of Search ............ 134/25.1, 42, 10, 1, 134/187, 94.1, 99.2, 184; 210/170, 768, 634, 259

[56] References Cited

U.S. PATENT DOCUMENTS

| | | | |
|---|---|---|---|
| 3,422,000 | 1/1969 | Bichard | 208/11 |
| 3,554,286 | 1/1991 | Feuerbacher | 166/266 |
| 3,831,288 | 8/1974 | Stribling et al. | 34/1 |
| 3,969,220 | 7/1976 | Anderson et al. | 208/11 LE |
| 4,054,506 | 10/1977 | Hart, Jr. et al. | 208/11 LE |
| 4,120,777 | 10/1978 | Globus | 208/11 LE |
| 4,136,014 | 1/1979 | Vermeulen et al. | 208/11 LE |
| 4,151,067 | 4/1979 | Grow | 208/11 LE |
| 4,193,448 | 3/1980 | Jeambey | 166/60 |
| 4,270,609 | 6/1981 | Choules | 166/303 |
| 4,301,865 | 11/1981 | Kasevich et al. | 166/248 |
| 4,396,062 | 8/1983 | Iskander | 166/248 |
| 4,398,597 | 8/1983 | Haberman | 166/57 |
| 4,443,322 | 4/1984 | Jubenville | 208/11 LE |
| 4,765,885 | 8/1988 | Sadeghi et al. | 208/391 |
| 4,891,131 | 1/1990 | Sadeghi et al. | 208/390 |
| 5,055,196 | 10/1991 | Darian et al. | 134/40 |
| 5,240,570 | 8/1993 | Chang et al. | 204/130 |

FOREIGN PATENT DOCUMENTS

| | | | |
|---|---|---|---|
| 756078 | 4/1967 | Canada | 196/11 |
| 1094483 | 1/1981 | Canada | 196/19 |

Primary Examiner—Richard O. Dean
Assistant Examiner—Zeinab El-Arini
Attorney, Agent, or Firm—Marvin E. Jacobs

[57] ABSTRACT

Soil contaminated with contaminants such as a heavy hydrocarbon or a chlorinated hydrocarbon is cleaned, preferably on-site, by contacting the contaminated soil with a supersurfactant such as the micellar surfactant formed by sonicating polar substituted heavy hydrocarbon in the presence of an alkali metal salt such as sodium silicate and a free radical generating agent such as hydrogen peroxide and sonicating the suspension. At least 85% of the contaminant is flushed or washed from the soil including fine particles having a particle size below about 70 microns.

21 Claims, 2 Drawing Sheets

SURFACTANT SOIL REMEDIATION

TECHNICAL FIELD

This invention relates to remediation of contaminated soil and, more particularly, this invention relates to remediation of soil containing organic or inorganic contaminants by contacting the soil with aqueous media in the presence of a surfactant.

BACKGROUND OF THE INVENTION

Industrialization has raised the standard of living throughout most of the world. However, manufacture of material goods results in creation of chemical waste byproducts that have been dumped, stored on-site or moved to storage dumps. The storage of heating fuel and other hygroscopic hydrocarbons in underground or surface tanks made of iron over many years has resulted in deterioration and rupture of the tanks. The hydrocarbon liquids can then percolate into the adjacent soil creating a hazardous mixture or can contaminate potable water supplies underlying the spill. The number of sites requiring remediation throughout the world is staggering.

Though the severity and seriousness of the soil contamination problem has been recognized and efforts to clean up the sites has started, there is a continuing accumulation of hazardous materials from current manufacturing activities and there are fewer and fewer sites available which will accept and store such wastes. Unless the contaminated soil can be treated on-site, transportation of large amounts of contaminated soil over long distances may be required and can add a substantial cost to the manufacturing process and product. The generator of the waste is also required to pay annual fees to store the waste.

On-site remediation can cost as much as $200 to $400 per ton of soil and may only result in a remediation of a portion of the soil. Depending on the soil type and grain size distribution, the contaminants may concentrate into a fraction of the soil. This fraction may still require transportation and storage at a designated hazardous waste storage facility.

Incineration can be an appropriate on-site means to remediate contaminated soil. However, fuel is expensive and the stack gases often contain undesirable air pollutants. In-situ soil cleaning with solvents has also been proposed as a means of remediation. However, solvents are expensive, may be hazardous or toxic, are often flammable and the dissolved mixture can migrate into underground water supplies thereby creating a worse problem.

Soil washing is another potential on-site remediation technology. Soil washing can be defined as the ex-situ treatment of contaminated soil using water as the primary solvent. The cleaned fraction is returned to the excavated site. Oversize materials are mechanically removed from the soil and may be treated by spray washing to remove contaminants.

Soil washing has been practiced in Europe since the mid1980's and since 1990 it has been approved in the United States for remediation at 17 Superfund sites. The technology is most effective in remediating coarse grained sands or gravels contaminated with organic or inorganic compounds.

The fine grain clay or silt fraction below about 70 microns presents difficult problems in removing the contaminants by traditional soil washing techniques. Over time, as a result of migration, weathering and degradation, soil contaminants, having a greater affinity for the fine-grained materials, will tend to accumulate and concentrate on the fine grain particles. The physical characteristics of the fine grain particles result in greater adhesion of contaminants than on the coarse grain fractions. The fine grain particles have greater surface area and greater adsorptive binding forces than do larger particles. The surfaces of clay particles can be charged which contributes to adsorption and also to dispersion of the particles as colloidal suspensions in the liquid phase. The fine particle fraction is difficult to treat and to separate from the liquid phase.

Due to the difficulty in removing the contaminants from the fine fraction, soil washing is used in conjunction with other remediation operations such as incineration or soil washing is used to concentrate the contaminants in the fine fraction which is then transported to a licensed storage facility. The volume reduction of the contaminated soil produced by traditional soil washing does therefore provide a cost benefit by substantially contributing to reduction in the volume of waste. The traditional process can concentrate 70-90% of the non-volatile organic and heavy metal residual products into the fine fraction representing 5-40% of the original soil volume. Reduction in volume can itself contribute to cost effectiveness. However, traditional soil washing does not clean all of the soil. The fine fraction, if still contaminated, must be stored permanently or until a feasible remediation technology is developed.

There have been attempts to augment the removal of contaminants from soil by agitation to provide abrasive scouring and/or scrubbing action. Surfactants can be employed to increase mobility of the washing fluid by reducing surface tension and to enhance release of the hydrophobic organic contaminant from the surface of the soil particles by reducing interfacial tension (IFT). Though recovery of contaminants is improved, a substantial amount of organic contaminant typically remains with the fine fraction.

Another disadvantage of traditional soil washing is the movement of contaminant into the wash water and the necessity and expense of treating and disposal of the wash water and the need to constantly add substantial amounts of make up water.

Another method of cleaning contaminated soil is soil flushing. Soil flushing can be practiced ex situ at the surface or in situ. A liquid is applied to a column of soil percolates downward and mobilizes the contaminant and transports it downward to a collection zone where the mobilized contaminants collect. The solution of contaminants is purged to the surface from this zone. The leach liquid can flow by gravity or can be placed under pressure to pump it through the contaminated zone. In situ delivery can include surface flooding, ponding, spraying, filtering and subsurface infiltration beds and galleries.

Soil flushing accelerates the recovery of contaminant from the soil. The flushing fluid can be water, enhanced water or gas to accelerate dissolution reactions such as sorption, acid-base solutions, precipilation, oxidationreduction, ion pairing or complexation or biodegradation reactions. Furthermore, soil flushing can accelerate transport of contaminants by advection, dispersion, diffusion or depletion by volatilization or dissolution.

Soil flushing has an especially useful application for cleaning soil beneath structures and especially soil contaminated with chlorinated hydrocarbons. No excavation or surface access is required. There also are no soil replacement or disposal costs. Exposure to workers is less than in ex situ methods.

Removal efficiencies appear related to site hydrogeology. Channelling or finger flow can occur which results in nonuniform removal of the contaminant throughout the zone. The relationship between capillary pressure, water content and permeability is not generally understood. Furthermore, the contaminant appears to have stronger affinity for smaller particles. For these reasons, it has been recommended that soil flushing applications be limited to sites with sandy soil, organic carbon content <2% clay and silt fines >15% bind having a high hydraulic conductivity ($>10^{-4}$ cm/sec).

It has been noted that the rate of percolation of a flushing liquid through a zone of soil is reduced on successive flushing. It is believed that the reduction in permeability is due to plugging of pores with fine grain material, large surfactant molecules, bacterial buildup or swelling of the soil. The size of the surfactant molecules appears to be the predominant factor since flooding with water without surfactants does not result in a significant reduction in permeability.

The residual hydrocarbon concentration is controlled by the water solubility of hydrocarbon contaminants, the interfacial tension (IFT) between the contaminant and water and soil and the relative permeability of the contaminant and water. The very low solubility of most hydrocarbons in water restricts the use of water flushing. However, proper surfactants can effectively reduce the IFT and can enhance hydrocarbon recovery by suspending the hydrocarbon in an emulsion phase.

STATEMENT OF THE INVENTION

It has now been discovered in accordance with the invention that the removal of contaminants from soils containing a substantial percentage of fines can be significantly enhanced by contacting the soil with a surfactant produced by sonicating a hydrocarbon having polar groups in aqueous suspension in presence of a base. The soil can be suspended in water and the suspension subjected to sonication. The soil can also be cleaned by moving an aqueous fluid containing said surfactant through a body of contaminated soil. The removal of contaminants is further enhanced by conducting the treatment in the presence of a surfactant and especially a supersurfactant containing a large range of sizes of vesicles, particularly a supersurfactant produced by sonicating a material containing anionically substituted hydrocarbon compounds in the presence of a basic salt. It is preferred to develop the supersurfactant from a sample of the contaminated soil so that the surfactant micelles have a natural similarity to and affinity for the contaminants.

The use of the surfactant can eliminate the need to separate the fine fraction from the soil. It also can allow retention of the treated soil on site where it can be returned to the excavation. The ultrasonic soil washing process including the surfactant can generate fresh surfactant in-situ during the process. Furthermore, the supersurfactant can be recycled several times to clean the soil which lowers cost and conserves process water. The supersurfactant is also found to work with waters having a high salt content. The supersurfactant may exhibit detergent rather than miceller surfactant activity in saline water. However, the use of ocean or brackish water can greatly reduce process cost especially when cleaning beaches contaminated by oil spills. The surfactant of the invention is found to lower interfacial tension between the contaminant and water and between the soil particles and water which facilitates soil flushing.

Moreover, the supersurfactant appears to induce fractionation or "cold-cracking" in which an oily fraction thicker than the contaminant itself, rises to the surface where it can be removed by skimming or overflow into a recovery vessel. The process thereby generates two products: a recovered contaminant and clean soil.

The system of the invention can be applied to soils contaminated with inorganic or organic contaminants though it is most useful in treating soils contaminated with hazardous, heavy hydrocarbons and especially, those soils in which the fine grained fraction exceeds 20–40% by weight of the soil. Up to 90% by weight or more of the contaminant is removed simultaneously from the mixture of coarse and fine grains. Typical hazardous materials that can be substantially eliminated from soils are petroleum, diesel fuels, heating oil, jet fuel, kerosene, gasoline, fuel processing residues, creosote, metal salts, solvents such as chlorinated ethylenes, halogenated hydrocarbons such as polychlorinated biphenyls, pesticides and herbicides. The system of the invention can also be used to treat mixed hazardous wastes rich in hydrocarbon residues such as those materials stored at the Casmalia and Kettleman Hills sites. These wastes may contain mixtures of organic compounds or organic and inorganic compounds such as radioactive compounds. The invention can also be used to clean crude oil contaminated sands such as in Kuwait or crude from ocean spills such as the Exxon Valdez that migrate onto beaches.

The process of the invention does not require application of heat or pressure, though local heating develops during cavitation attendant to sonication of the particulate suspensions. Preheating the supersurfactant to moderate temperatures from 30° C. to 75° C. appears to increase rate and effectiveness of the treatment.

The invention significantly enhances the environment by reducing the amount of contaminated soil present at hazardous sites and returns the site to active use. The invention is cost effective since the amount of soil to be treated by other more costly methods is substantially reduced. The process can be practiced in a closed environment, controlling fugitive dusts and volatile emissions. The process can remove up to 99% or more of contaminants from fine grained soil.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
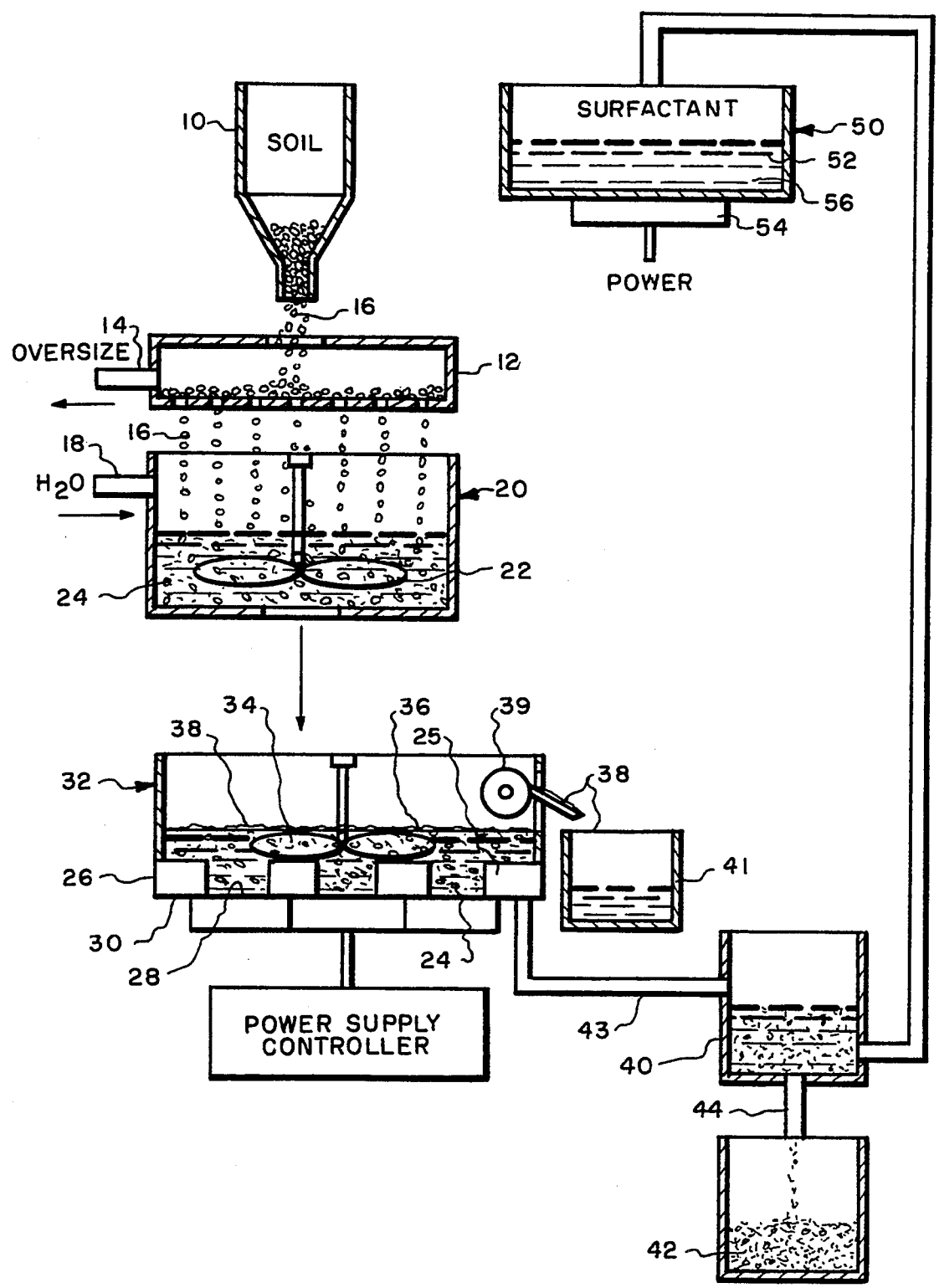
FIG. 1 is a block diagram view of a first system for treating contaminated soil in accordance with the invention.

Referring now to FIG. 1, the system of the invention proceeds by classifying soil 16 from tank 10, in a classifier 12 to remove large particles 14 over 5 mm such as tree branches, tires, metal pieces, etc. The soil 16 is then mixed with water 18 in a slurry tank 20 containing a mixer 22 to form a slurry 24. The slurry 24 is then fed into contact with transducers 26 mounted on the inside wall 28 or outside wall 30 of the soil washing tank 32. The tank 32 may also contain a mixer 34 which circulates the slurry 24 past the surface 25 of the transducers 26 during treatment.

During sonication, minute vacuum bubbles form and implode. This action creates heat and mechanical energy at the surface of the particles and softens viscous contaminants such as heavy hydrocarbons, dislodges them from the surface of the particles and can fractionate them into individual molecules which rise to the surface of the suspension. An oily film 38 which can then rise to the surface 36 of the slurry 24 where they can be skimmed off by means of a skimmer 39 and can be recovered in tank 41. The sonicated slurry 24 can then flow through outlet 43 into a settling/separation tank 40. The surfactant 52 is removed from the tank 40 and is recycled to tank 50 through line 45. Clean soil 42 is recovered from the outlet 44 to the settling/separation tank 40.

Various additives can be added to the slurry tank 20 such as inorganic bases, acids or salts, surfactants, detergents, metal binding agents such as chelating agents and the like.

The preferred surfactant is formed by sonication of an aqueous suspension of anionically substituted hydrocarbon in the presence of a strong base such as a Group 1 or II metal hydroxide, carbonate, phosphate or silicate. The addition of an oxidizing material such as hydrogen peroxide during the formation of the preferred surfactant promotes the formation of the atomically substituted hydrocarbons. The intense local turbulence and heat caused by the cavitation, causes the inorganic base to react with anionic polar groups such as carboxylate groups on the organic contaminants to form water soluble surfactant compounds which in turn form micelles and vesicles over a wide range of sizes from very small, less than a micron up to large, about 10 microns. The supersurfactant preferably includes at least 30% micelles having a size below 70 microns. These small micelles can enter pores in the contaminated soil thereby more effectively dislodging, dissolving or emulsifying the contaminant prior to transferring the contaminants to the aqueous emulsion phase of the suspension. The base ions also can contribute to neutralizing any electrostatic or other adhesive force between the soil particle and the contaminant layer which surrounds it.

The action of the supersurfactant is accelerated by the presence of a small amount of a free radical agent such as those disclosed in U.S. Pat. Nos. 4,765,885; 4,897,131 and 5,017,281 the disclosures of which are expressly incorporated herein by reference. Only a trace amount is necessary. As little as $10^{-4}$ to 1.0 gram of a free radical activator such as hydrogen peroxide, benzoyl peroxide or azoisobutyronitrile per 100 grams of organic contaminant significantly decreases the time required to separate contaminants from the particles.

If the contaminants do not contain sufficient polar groups the separation reagent can be premanufactured from tar sands and inorganic base, preferably under basic conditions. A pH of at least 7 appears to be necessary for supersurfactant activity. The preferred inorganic base is sodium silicate and, especially sodium silicates having a $SiO_2/Na_2O$ ratio of from 1.6 to about 3.20.

Referring again to FIG. 1, the system may contain a surfactant supply tank 50 which adds surfactant 52 to the slurry tank 20. The tank 50 may be used to manufacture supersurfactant and may contain transducers 54 to sonicate a suspension 56 of the contaminated soil or tar sand in the presence of a base such as sodium silicate. The concentration of the base in the supersurfactant make up solution is from 1 to 20 percent by weight, usually 3 to 10 percent by weight. The ratio of base to organic contaminant such as crude oil is from 1/10 to 10/1 usually about 0.5/1 to 2/1.

Figure 2:
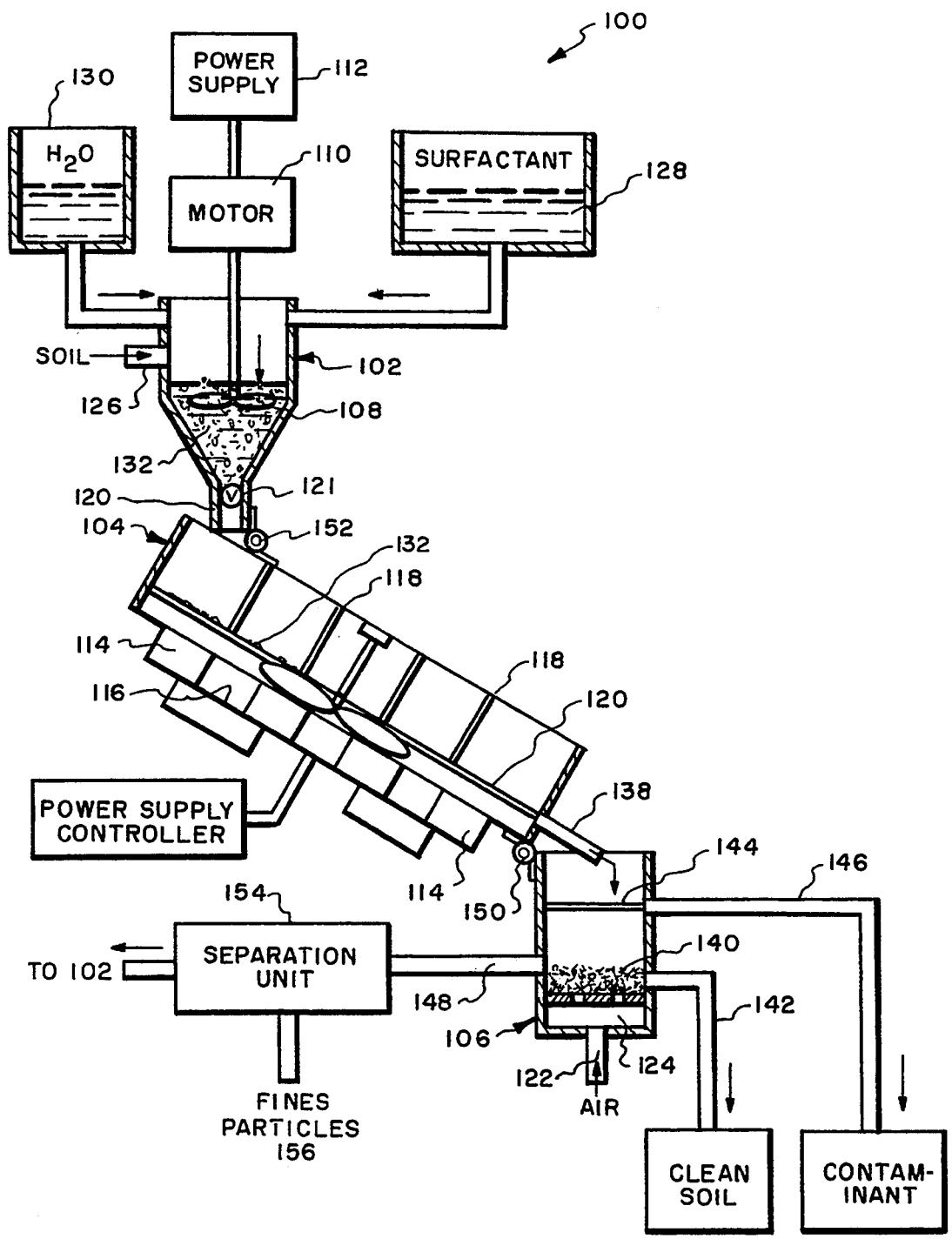
FIG. 2 is a schematic view of a continuous flow, soil remediation system according to the invention.

A continuous flow system 100 is illustrated in FIG. 2. The system 100 includes a mixing hopper 102, a sonication trough 104 and a settling tank 106 connected in series. The mixing hopper 102 contains a paddle mixer 108 driven by motor 110 connected to power supply 112. A plurality of transducers 114 are disposed on the bottom wall 116 of the sonication trough 104 and are electrically connected to the power supply and controller 112. A set of adjustable baffles 118 controls the level of the layer 120 flowing over the transducers 114. An air supply 122 is connected to an air injector chamber 124 positioned at the bottom of the settling tank 106.

The system is operated by adding contaminated soil 126, surfactant 128 and water 130 to the mixing hopper 102 and rotating paddle mixer 108 to form a suspension 132. The suspension 132 flows out the outlet 121 into the sonication trough 104. The baffles 118 are adjusted to form a narrow layer 120 of suspension over the transducers 114. The transducers sonicate the layer 120 to remove contaminants from the particles. The suspension 132 flows through outlet 138 into the settling tank 106. The sonication trough 104 can be hingedly connected to the mixing hopper 102 and settling tank 106 by means of hinges 150, 152 and the pitch of the trough can be adjusted to control the rate of flow of the suspension 132.

Large particles 140 settle to the bottom of the settling tank 106 and they are recovered at outlet 142. The air bubbles float the contaminant to the top of the suspension to form a layer 144 recovered through outlet 146. The surfactant and fine particles are removed through outlet 148 which can be recycled to the mixing hopper 102. Fine particles 156 can be removed from the recycled stream by floatation, filtration, centrifugation, etc. in separation unit 154.

The particles forming the suspension should be free and independent. Large objects are first removed by screening. Usually particles larger than 5 mm are removed by screening. If the excavated soil contains large agglomerates the screened soil is crushed in a mill to form particles passing a 60 to 80 standard U.S. mesh screen. The crushed particles are then mixed with water to form a suspension. The amount of solid particles present in the suspension depends on the concentration of separation reagent, the energy and frequency of the sonication applied to the suspension, and the depth of the suspension. Usually the particles form from 1 to 50 percent by weight of the suspension, preferably from 10 to 30 percent by weight.

The suspension is preferably subjected to a pretreatment before being fed to the sonication unit. During pretreatment the surfactant can penetrate the layer of contaminant, reduce surface tension at the interface of the soil particle and hydrocarbon layer. The surfactant also coats the outside surface of the contaminant coated particles and increases the fluidity and lowers viscosity of the suspension. The pretreatment can be conducted at ambient temperature or the suspension can be heated to 100° C. in the pretreatment vessel. The recycled stream from the sonication vessel is usually at an elevated temperature from 40°-60° C. as a result of the heat generated during sonication. The use of heated recycle stream will preheat and soften the contaminant layer.

The frequency and power of the sonic energy applied to the suspension depends on the location of the transducers, thickness and solids content of the suspension, solubility or dispersibility of the contaminant, etc. The transducers are preferably water resistant and can be disposed within the suspension. Suitable transducers are 25 kHz immersible piezoelectric transducers manufactured by Bronson, operating at 720 watts.

The transducers can be located along one wall such as the bottom wall of the sonication trough or can also be disposed on the side walls and top wall of a closed trough. The frequency of the sonication controls the number of implosion sequences per unit time. For example, at 45 kHz ultrasonic frequency, about 90,000 bubbles form and implode per second in the suspension. The ultrasonic frequency is usually from 10 to 60, typically 20-45 kHz.

The suspension can be stationary and treated as a batch process. It is preferred to agitate or circulate the suspension so that all contaminated particles flow in a narrow zone past the surface of the transducers. The active sonication zone can be as small as 1-2 inches and is usually no more than 20 inches. The suspension can be recirculated and allowed to flow into the sonication zone and past the transducers a plurality of times or the layer of suspension can flow past the transducers only once in a continuous or semi-continuous process.

The sonication of an aqueous suspension of contaminated soil containing a significant fine grain fraction at these frequencies is found to remove a significant portion of the contaminant from the soil. The recovery of contaminant can be enhanced by use of additives. Chelating agents such as ethylenediamine tetra acetic acid (EDTA) can be used to bind heavy metals. PH adjusting agents such as inorganic or organic acids or bases can be added. It is preferred to maintain the suspension at a pH above 7 during pretreatment and sonication usually with a sodium or potassium oxide or hydroxide.

Many types of surfactants can be added to the suspension. Nonionic and anionic surfactants are preferred. Suitable nonionic surfactants are the polyakylene oxide based detergents. Representative anionic surfactants are long chain $C_{10}$-$C_{24}$ akyl, alkylaryl, sulfate, carboxyl or sulfonic acids such as sodium dodecyl sulfate (SDS). As previously discussed, surfactants formed by sonication of a mixture of large chain hydrocarbon substituted with polar groups form a very active and effective supersurfactant. The supersurfactant under the influence of cavitation contains a wide range of vesicle sizes including at last 30% of small micelles below 70 microns and preferably at least 10% of micelles below 10 microns. The small micelles are effective in removing the contaminant layer from the below 70 micron fraction of the soil. The vesicles in combination with the high anion concentration weaken the physical force binding the hydrocarbon contaminant layer to the soil particles. The sonication waves and cavitation forces drive the small micelles and multilayer vesicles into the small pores in the soil penetrating the hydrocarbon layer therein and chemically and physically disrupting the layer thereby removing it from the particle and emulsifying the hydrocarbon into the aqueous suspension. If the hydrocarbon contamination includes fractions containing polar groups the supersurfactant can incorporate the polar substituted contaminant material into membranes by invasion of the micelles into vesicles and stabilization of the hydrocarbon by the resin components of the layer of the vesicle as disclosed in U.S. Pat. Nos. 4,765,885; 4,891,131 and 5,017,281, the disclosures of which are expressly incorporated herein by reference. This activity fractionates and separates a light hydrocarbon layer which floats to the top of the suspension. This cold-cracking separation process operates by means of membrane-mimetic chemistry.

A reagent known as REMSOL based on tar sand can be utilized initially to start the process until enough supersurfactant is formed in-situ in the sonication tank or the tar sand based reagent can be solely used as the separation reagent for the separation process.

REMSOL is usually prepared in the absence of organic solvent. The reagent is prepared by adding 10-35 percent by weight of tar sand and at least 0.01 percent by weight of an alkaline metal salt such as sodium silicate to water and sonicating the suspension for a time sufficient to form a surfactant. A small amount of a peroxide such as hydrogen peroxide can be present as an adjuvant to increase the rate of separation. A light layer of hydrocarbon is removed from the surface and asphalt agglomerates and sand are removed from the bottom of the sonication vessel. Usually the aqueous phase of the first suspension contains 40-70 percent of the supersurfactant. The time needed for separation of contaminants is enhanced by the addition of a free radical agent as previously discussed.

Supersurfactant separation reagent was prepared according to the following procedure.

EXAMPLE 1

Approximately 50 ml of sodium silicate was added to 1000 ml of distilled water in a one liter glass beaker. This solution was then heated to 45° C. and stirred until all sodium silicate dissolved. 200 grams of Athabasca tar sand (14% hydrocarbon) was added to the solution to form a suspension. About 1 ml of 35% hydrogen peroxide was added to the suspension. The beaker was then placed into a sonic bath and sonicated at 45 kHz with stirring at 320 RPM for 5 to 30 minutes. The sonicator contained a 3 gallon bath. The bath could be sonicated with variable energy output up to 0.5 watts/square inch and the frequency could be varied up to about 40 kHz. The solution becomes very dark. About 5% of the bitumen dissolved to form the supersurfactant REMSOL. Higher concentrations of REMSOL, up to 20% are obtained by sonicating the suspension for a longer period of 1-3 hours. The solution was set aside for several hours until the solids settled out. The bitumen on top of the solution was removed and the solution of REMSOL was carefully poured off and saved.

The supersurfactant of Example 1 was tested for aquatic toxicity against the Fathead Minnow for 96 hours by the State LC 50 toxicity test. REMSOL does not have an aquatic 96-hour LC 50 less than 500 mg/L with Fathead Minnows and according to 22 Cal.Adm. Code, Art. 11, Sec. 6696(4) is not hazardous or toxic by this criterion.

EXAMPLE 2

A test of the surfactant properties of REMSOL for a highly contaminated soil was conducted. Soils obtained from a petroleum refinery contaminated with a complex mixture of a heavy vacuum gas oil, Diesel No. 2 hydrocarbon was tested by adding REMSOL to a 20% suspension of the soil in a sonication tank at 45 kHz. Within 2 minutes of stirring, a visible dark layer formed on the surface of the suspension. The contaminant was removed from all soil particles including fines. The soil is a mixture of clay and degraded sandstone.

EXAMPLE 3

A standard soil was prepared by screening soil to remove large soil particles and organic matter larger than 1 mm. The soil was then heated at 400° C. in a muffle furnace to remove any other organic material. Various hydrocarbon contaminants were then added to the soil and tested under a variety of conditions.

EXAMPLE 4

500 grams of the roasted, clean sandy soil of Example 3 was mixed for 8 hours with 2.4% by weight of Diesel No. 2 in a sealed bottle to ensure homogeneity. 10 grams of the contaminated standard soil and 50 grams of the roasted soil were extracted using 1:1 v/v hexane:acetone to develop background levels of hydrocarbon contributed by the soil.

TABLE 1

| Sample | Concentration of Hydrocarbon Mg/kg |
|---|---|
| Clean Roasted Soil | <5 |
| Diesel contaminated Soil | 24,000 |

EXAMPLE 5

Suspensions of 50 grams of the standard soil of Example 4 were prepared in 100 ml of deionized (D.I.) water. A 1% dilution of REMSOL of Example 1, a 5% dilution of REMSOL of Example 1 and a 20% dilution of REMSOL of Example 1 were prepared. Suspensions of 50 grams of roasted clean soil in 100 ml of D.I. water and 1% dilution of REMSOL were prepared. These suspensions and 100 ml stock REMSOL from Example 1 in 250 ml sealed jars were rotated for 8 hours. The samples were then sonicated for 30 minutes at 40 kHz using a Bronson Sonic 4 sonicator. The supersurfactant liquid (95-99 ml) was decanted. The remaining soil was extracted with 3-20 ml of (1:1 v/v) hexane:acetone solvent. The combined extracts were concentrated to 2 ml and analyzed by gas chromatography/mass spectrometry. The 100 ml of REMSOL was extracted with methylene chloride to determine the amount of hydrocarbon contributed by the reagent.

TABLE 2

| Sample | Residual Hydrocarbon Concentration, mg/kg | Percent Hydrocarbon Removed |
|---|---|---|
| Cont. Soil @ D.I. H$_2$O | 2500 | 90 |
| Cont. Soil @ 1% REMSOL | 1700 | 93 |
| Cont. Soil @ 5% REMSOL | 1100 | 95 |
| Cont. Soil @ 20% REMSOL | 970 | 97 |
| Clean Soil @ D.I. H$_2$O | <5 | — |
| Clean Soil @ 1% REMSOL | <5 | — |
| 100 ml REMSOL | * | <0.2 |

*Not applicable

Sonication in water alone was effective in removing 90% of Diesel No. 2 oil from the soil. The recovery of the Diesel oil increased from 93 to 97% as the concentration of the supersurfactant increased from 1% to 20% by volume. The clean roasted soil showed less than 5 mg/kg of Diesel No 2 which is the detection limit for the measurement. The hydrocarbon contribution of the reagent to the residual soil was negligible.

EXAMPLE 6

The ability of REMSOL of Example 1 to separate hydrocarbons from soil was compared to a commercial soap, surfactant, which is believed to be based on detergent alkylate surfactants. 100 ml of D.I. water containing 5 drops of the commercial surfactant, was added to 10 grams of the contaminated soil of Example 4. The suspension and a suspension of 100 ml of D.I. water containing the 20% REMSOL dilution were sonicated for 30 minutes at the same frequency and power. The supernatant liquids were poured off and the residual soil was extracted with solvent and analyzed as in Example 5. Results follow:

TABLE 3

| Sample | Hydrocarbon Concentration In Soil mg/kg | Percent Removal |
|---|---|---|
| REMSOL (20%) | 1800 | 92.5% |
| Commercial surfactant | 3200 | 86.7% |

The REMSOL sonicated soil is nearly twice as clean as the soil sonicated with ordinary detergent.

EXAMPLE 7

The solvation action of REMSOL without sonication on Santa Maria Crude Oil, a heavy, tarry crude, was compared to that of water and seawater. Soil was contaminated with crude, rinsed with 35 ml of 5% REMSOL (Example 1)(A), D.I. water (B) or sea water (C). The extracted soil samples and supersurfactant solution were separately extracted with dichloromethane results follow:

TABLE 4

| Sample | Total Crude Recovery (mg) | Percent of Total Recovery |
|---|---|---|
| A |  |  |
| REMSOL | 39 | 33 |
| Soil | 79 | 70 |
| Total | 118 | 100 |
| B |  |  |
| Water | ND | 0 |
| Soil | 123 | 100 |
| Total | 123 | 100 |
| C |  |  |
| Sea Water | ND | 0 |
| Soil | 163 | 100 |
| Total | 163 | 100 |

Neither water nor sea water shows solvation action or crude contaminated soil. REMSOL dissolved about ⅓ of the crude without sonication.

EXAMPLE 8

A matrix that resembles the beach sand at Valdez Alaska was prepared from a mixture of coarse sand, fine sand, gravel and rocks. The matrix was contaminated with 160,000 parts per million of crude oil. The contaminated sample was mixed with the 5% REMSOL separation reagent prepared in Example 1 and sonicated under the conditions of Example 2. The untreated matrix (A), contaminated matrix (B), and treated matrix (C), were extracted with methylene chloride. Results follow:

TABLE 5

| Sample | mg/kg Hydrocarbon |
|---|---|
| A | 18 |
| B | 160,000 |
| C | 10 |

The treated matrix had less hydrocarbon than the untreated material. The reagent removed essentially all the crude from the beach sand. (More than 99.99% removed).

EXAMPLE 9

The following matrixes were subjected to extraction with 5% reagent of Example 1 with application of sonication at 0.5 water/sq.in. in a 3 gallon bath for 2 hours at 40 kHz. The samples were stirred. The suspensions were skimmed and stirred every 30 minutes. Results follow:

TABLE 6

| Matrix/Contaminant | Clean Matrix | Matrix plus contaminant | After treatment | % Contaminant Removed |
|---|---|---|---|---|
| TAR SAND | n/a | 74,000. | 140. | 99.8% |
| Coarse Beach Sand w/CRUDE OIL | 18. | 160,000. | 10. | 99.99% |
| Bentonite with CRUDE OIL | 24. | 180,000. | 1,200. | 99.3% |
| Modeling Clay with CRUDE OIL | 160,000 | 310,000. | 400. | 99.9% |

The remediation reagent uniformly removed substantially all the heavy hydrocarbon contaminant from the matrixes even fine clays such as Bentonite, though the Bentonite containing sample had to be centrifuged after extraction. Modeling clay contains a high concentration of wax material as sold. It is noted that the wax material was extracted along with the Crude Oil.

EXAMPLE 10

Soil washing experiments were conducted on several different matrixes with the reagent of Example 1 under the conditions of Example 2. Samples were sonicated for 2 hours. Every 30 minutes the samples were stirred and then separated hydrocarbon was skimmed from the surface. Results follow:

TABLE 7

CONTAMINANT CONCENTRATIONS In mg/kg

| Matrix/Contaminant | Replicate Number | Matrix Plus Contaminant | After REMSOL Treatment | % Contaminant Removed |
|---|---|---|---|---|
| Athabasca | 1 | 74,000. | 140. | 99.8% |
| TAR SAND | 2 | 74,000. | 240. | 99.7% |
| Coarse Beach | 1 | 100,000. | 50. | 99.9% |
| Sand w/CRUDE OIL | 2 | 100,000. | 70. | 99.9% |
| Coarse Beach | 1 | 100,000. | 240. | 99.8% |
| Sarid W/DIESEL #2 | 2 | 100,000. | 270. | 99.7% |
| Fine Beach Sand | 1 | 35,000. | 200. | 99.4% |
| w/CRUDE OIL | 2 | 35,000. | 240. | 99.3% |
| Clay Soil | 1 | 100,000. | 2,100. | 97.9% |
| W/CRUDE OIL | 2 | 100,000. | 3,600. | 96.4% |
|  | 3 | 100,000. | 4,300. | 95.7% |
| Clay Soil w/DIESEL #2 | 1 | 100,000. | 180. | 99.8% |
| Soil Spiked w/PCB | 1 | 600. | 27. | 95.5% |
| AROCLOR 1260 | 2 | 600. | 59. | 90.2% |
|  | 3 | 600. | 27. | 95.5% |
| Coarse Beach Sand | 1 | 100,000. | 290. | 99.7% |
| w/WASTE OIL | 2 | 100,000. | 340. | 99.7% |
| coarse Beach Sand | 1 | 100,000. | 120. | 99.9% |
| w/HYDRAULIC OIL | 2 | 100,000. | 1,300. | 98.7% |
| Fine Beach Sand | 1 | 100,000. | 170. | 99.8% |
| w/CRUDE OIL (time | 2 | 100,000. | 170. | 99.8% |
| study) | 3 | 100,000. | 140. | 99.9% |
|  | 4 | 100,000. | 60. | 99.9% |
| Fine Beach Sand | 1 | 100,000. | 170. | 99.8% |
| w/WASTE OIL | 2 | 100,000. | 190. | 99.8% |
| Fine Beach Sand | 1 | 100,000. | 100. | 99.9% |
| w/HYDRAULIC OIL | 2 | 100,000. | 200. | 99.8% |
| Clay Soil | 1 | 200,000. | 1,100. | 99.5% |
| w/WASTE OIL | 2 | 200,000. | 1,700. | 99.2% |
| Clay Soil | 1 | 100,000. | 880. | 99.1% |
| w/HYDRAULIC OIL | 2 | 100,000. | 1,500. | 98.5% |

In the time study, the remaining sand in the sample was analyzed for residual Oil after every 30 minutes,.

The use of separation reagent with sonication resulted in essentially complete remediation of light or heavy hydrocarbon contamination of fine or coarse soil matrixes.

EXAMPLE 11

In this experiment, suspensions of contaminated soil were subjected to sonic energy and constant stirring during extraction with the reagent of Example 1. Each suspension was sonicated for two hours, during which time sub-samples were taken and analyzed at 15 minute intervals. Results follow:

TABLE 8

| Matrix/ Contaminant | Time Interval | Sample Number | Starting Concentration | After REMSOL Treatment | % Contaminant Removed |
|---|---|---|---|---|---|
| Clay Soil w/ CRUDE OIL | 15 min. | 1 | 100,000 | 4,200. | 95.8% |
| Clay Soil w/ CRUDE OIL | 30 min. | 2 | — | 3,400. | 96.6% |
| Clay Soil w/ CRUDE OIL | 45 min. | 3 | — | 3,600. | 96.4% |
| Clay Soil w/ CRUDE OIL | 60 min. | 4 | — | 1,700. | 98.3% |
| Clay Soil w/ CRUDE OIL | 75 min. | 5 | — | 2,000. | 98.0% |
| Clay Soil w/ CRUDE OIL | 90 min. | 6 | — | 4,800. | 95.2% |
| Clay Soil w/ CRUDE OIL | 105 min. | 7 | — | 3,000. | 97.0% |
| Clay Soil w/ CRUDE OIL | 120 min. | 8 | — | 5,100. | 94.9% |

It appears that remediation was at a maximum in about 1 hour. Further sonication resulted in no further improvement.

EXAMPLE 12

The procedure of Example 1 was repeated substituting a like amount of crude oil by weight for the tar sand. A dark, oily suspension resulted.

EXAMPLE 13

The surfactants of Example 1 and of Example 12 were utilized to treat soil containing 100,000 ppm of crude oil contaminant according to the procedure of Example 2. A control sample with only water was also run. All three suspensions were sonicated for 45 minutes and rinsed with deionized water 3 times. The soil samples were then analyzed for TPH using the EPA 418.1 method. Results follow:

TABLE 9

| Sample Treatment | Residual crude oil, ppm | % HC Removed |
|---|---|---|
| Surfactant of Example 1 | 670 | 99.3 |
| Crude Oil derived surfactant | 650 | 99.4 |
| Water | 48,000 | 52 |

These soil washing experiments were conducted in a mobile, trailer based pilot plant unit. The pilot plant contains a horizontally mounted mixing drum with internal flutes. The suspension moves down the flutes and enters a sonication trough. Three Bronson 20 mHz submersible, sonication transducers are mounted within the trough. The trough is mounted at an angel. The suspension moves down the trough by gravity, optionally aided by pumping, over the transducers as a narrow layer. The intense mixing separates the hydrocarbon from the soil. The hydrocarbon rises to the surface and is removed by skimming.

EXAMPLE 14

2 liters of sand contaminated with $10^5$ ppm of crude oil was formed into a suspension with 6 gallons of water containing 20% of the surfactant of Example 1 in the mixing drum of the pilot plant. The suspension was sonicated for 20 minutes. The cleaned sand was washed and analyzed. The residual hydrocarbon content was 160 ppm representing a 99.8% removal of hydrocarbon.

EXAMPLE 15

A test soil was prepared by sieving 30 mesh sand through a 200 mesh screen (75 microns). The fine fraction collected on the pan was spiked with $10^5$ ppm of crude oil. The contaminated soil was suspended (20% by weight) in the REMSOL reagent of Example 1 and sonicated under the conditions of Example 2 for 20 minutes. 95% of the fines suspended in the reagent were essentially free of contaminant. 5% of the fines were 95% free of contaminant. The amount of contaminated fines is reduced by 19 fold.

In certain cases, it may be necessary to conduct the soil washing in salt water or in extremely hard water due to the lack of available fresh water. In such cases, it has been found to be effective to add a chelating agent such as ethylene diamine tetracetic acid or some other inexpensive complexing agent in order to prevent the REMSOL surfactant from becoming rendered insoluble by calcium, magnesium and other cationic species present in salty and/or hard waters. It is most convenient to add the chelating agent to the water supply in whatever amount is observed to just prevent cloudiness from developing.

The supersurfactant is also found to effectively remove halogenated hydrocarbons from coarse or fine particles. The process is most effective with non-volatile compounds such as polychlorinated aromatic compounds containing 2–20 phenyl groups and containing from 2–100 chlorine groups. These compounds have been widely used in heat transfer, in capacitors, transformers and as pesticides. They are very persistent and are not degraded by the environment. They are extremely hazardous and toxic to animals in the food chain such as fish and birds. Since many of these compounds are soluble in animal fat, they accumulate in the flesh of fish and birds and can cause wide areas to the cultivation of crops or to the harvesting of fish or the production of eggs or fowl.

EXAMPLE 16

The REMSOL reagent of Example 1 made from 5% sodium silicate and 5% tar sand was used to remove PCB contamination from soil under the conditions of Example 2.

Three soil samples were spiked with 600 ppm of AROCLOR 1260. The samples were sonicated for 2 hours. They were skimmed and stirred every 30 minutes. Results follow:

TABLE 10

| | AROCLOR 1260 | | |
|---|---|---|---|
| SAMPLE | Initial ppm | After Treatment ppm | % Removal |
| 1 | 600 | 27 | 95.5 |
| 2 | 600 | 59 | 90.2 |
| 3 | 600 | 27 | 95.5 |

EXAMPLE 17

Four different soil matrices were spiked with capacitor oil containing varying amounts of a mixture of AROCLOR 1016 and AROCLOR 1254. The samples were sonicated for 20 minutes, stirred and skimmed then sonicated for an additional 20 minutes. Results follow:

TABLE 11

| Matrix/ Contaminant | PCB Type | Capacitor Oil Conc. In Matrix mg/kg | PCB Conc. in Matrix | After Treatment | % Contaminant Removed |
|---|---|---|---|---|---|
| Soil w/Aroclor | | | | | |
| 1016 | 1016 | 20,000 | 3.9 | 0.54 | 86 |
| 1254 | 1254 | 20,000 | 6.1 | 0.78 | 87 |
| Fine Beach Sand w/ | | | | | |
| 1016 | 1016 | 20,000 | 3.9 | 0.11 | 97 |
| 1254 | 1254 | 20,000 | 6.1 | 0.22 | 96 |
| Soil w/Aroclor | | | | | |
| 1016 | 1016 | 100,000 | 20. | 0.17 | 99 |
| 1254 | 1254 | 100,000 | 31. | 0.29 | 99 |
| Fine Beach Sand w/ | | | | | |
| 1016 | 1016 | 100,000 | 20. | 0.06 | 99 |
| 1254 | 1254 | 100,000 | 31. | 0.12 | 99 |

EXAMPLE 18

The procedure of Example 17 was repeated with Sampling of the soil after the first 20 minute interval. Results follow:

TABLE 12

| Time Interval | PCB Type | Capacitor Oil Conc. in Matrix | PCB Conc. In Matrix | After Treatment | % Contaminant Removed |
|---|---|---|---|---|---|
| After 20 min. | 1016 | 100,000 | 20. | 0.6 | 97 |
| | 1254 | 100,000 | 31. | 1 | 97 |
| After 40 min. | 1016 | 100,000 | — | 0.11 | 99 |
| | 1254 | 100,000 | — | 0.2 | 99 |

EXAMPLE 19

In this experiment the soil sample containing capacitor oil was sinicated for 20 minutes. The suspension was then drained and fresh reagent added before sonicating the suspension for an additional 20 minutes. Results follow:

TABLE 13

| Extraction Interval | PCB Type | Capacitor Oil Conc. in Matrix mg/kg | PCB Conc. in Matrix | After Treatment | % Continent Removed |
|---|---|---|---|---|---|
| Extn. #1 20 min. | 1016 | 100,000 | 20. | 0.18 | 99 |
| | 1254 | 100,000 | 31. | 0.31 | 99 |
| Extn. #2 20 min. | 1016 | 100,000 | 0.18 | 0.56 | |
| | 1254 | 100,000 | 0.31 | 0.52 | |

EXAMPLE 20

The procedure of Example 19 was repeated except that the soil was spiked with pure Aroclor 1260. Results follow:

TABLE 14

| Extraction Interval | PCB Type | PCB Conc. in Matrix mg/kg | After Treatment | % Contaminant Removed |
|---|---|---|---|---|
| Extn #1 20 Min. | 1260 | 600. | 13 | 98 |
| Extn #1 40 Min. | 1260 | — | 7 | 99 |
| Extn #2 20 Min. | 1260 | 7 | 8 | |

There does not appear to be any significant advantage in adding fresh reagent after the first extraction.

EXAMPLE 21

Experiments were conducted to determine the effectiveness of using a layer of solvent immersible with the suspension to absorb the PCB as it rises to the surface of the suspension. The sonication extractions were conducted in 20 minute intervals. Results follow:

TABLE 15

| Matrix/<br>Contaminant | Time<br>Interval | PCB<br>Type | Capacitor<br>Oil Conc.<br>in Matrix | PCB Conc.<br>In Matrix | After<br>Treatment | % Contaminant<br>Removed |
|---|---|---|---|---|---|---|
| Soil w/PCB | 20 min. | 1016 | 100,000 | 20. | 0.22 | 99 |
| 1016 & 1254<br>w/floating<br>hexane | | 1254 | 100,000 | 31. | 0.41 | 99 |
| Soil w/PCB | 40 min. | 1016 | 100,000 | — | 0.19 | 99 |
| 1016 & 1254<br>w/floating<br>hexane | | 1254 | 100,000 | — | 0.34 | 99 |
| Soil w/<br>Aroclor 1260<br>w/floating<br>hexane | 20 min. | 1260 | Pure<br>PCB | 600. | 15 | 98 |
| Soil w/<br>Aroclor 1260<br>w/floating<br>hexane | 40 min. | 1260 | Pure<br>PCB | — | 13 | 99 |
| Soil w/<br>Aroclor 1260<br>w/floating<br>hexane | 60 min. | 1260 | Pure<br>PCB | — | 8 | 99 |

The use of floating layer of solvent did not appear to increase the percent of PCB removed from the soil.

EXAMPLE 22

The distribution of PCB in the oil layer, reagent layer and cleaned soil was determined for soils spiked with PCB-capacitor oil and pure PCB. The samples were sonicated for 60 minutes in 20 minute intervals. Results follow:

TABLE 16

| Matrix/<br>Contaminant | Matrix<br>Layer | PCB<br>Type | Initial<br>PCB<br>Conc. | After<br>Treatment | PCB<br>Distri-<br>bution |
|---|---|---|---|---|---|
| Soil w/PCB | Oil | 1016 | 0. | 11.8 mg/kg | 98% |
| 1016 & 1254 | Layer | 1254 | 0. | 19.6 mg/kg | 98% |
| soil w/PCB | Reagent | 1016 | 0. | 0.003 mg/l | 0.025% |
| 1016 & 1254 | | 1254 | 0. | 0.005 mg/l | 0.025% |
| Soil w/PCB | Soil | 1016 | 12. | 0.24 mg/kg | 2.0% |
| 1016 & 1254 | | 1254 | 20. | 0.37 mg/kg | 1.9% |
| Soil w/<br>Aroclor 1260 | Reagent | 1260 | 0. | 98. | 98% |
| Soil w/<br>Aroclor 1260 | Soil | 1260 | 100. | 2.0 | 2.0% |

There was insufficient PCB to form a floating layer from the sample of soil containing pure PCB.

The reagent of the invention is found to remove from about 85 to 99% of PCB from contaminated soils whether containing coarse particles, fine particles or a mixture of fine and coarse particles. It was surprising that there was not additional removal of PCB in the 2 step extraction with fresh REMSOL reagent. This could be due to the presence of small pores that are not penetrated by the micelles of the REMSOL reagent.

The floating hexane was intended to remove the PCB before it could sink and recontaminate the soil. However, it was surprising to discover that the PCB's which are heavier than water did float to the surface. This may be due to the air bubbles in the PCB lowering the bulk density or the formation of a PCB-micelle aggregate that is lighter than water.

EXAMPLE 23

Samples of a coarse beach sand, fine beach sand and a clay soil were all contaminated with 100,00 mg/kg of crude oil. The fine sand and clay samples were sonicated for approximately 15 minutes. The coarse sand sample was sonicated for 25 minutes. All samples were stirred intermittently to re-disperse the oil and matrix. Results follow:

TABLE 17

| | Contaminant mg/kg | | |
|---|---|---|---|
| Matrix | Initial | After Treatment | % Removal |
| Coarse Beach Sand | 100,000 | 470 | 99.5 |
| Fine Beach Sand | 100,000 | 470 | 99.5 |
| Clay Soil | 100,000 | 1,900 | 98.1 |

An alternate solution for salt water applications involves the creation of a remediation surfactant or detergent reagent under strongly acidic instead of basic conditions. For example, this may be accomplished by treating the tar sand or on-site hydrocarbon mixture with concentrated sulfuric acid in place of the usual sodium silicate. The surfactant thus produced may be used in salt water or hard water without the development of cloudiness and without the need for a chelating agent.

It is to be realized that only preferred embodiments of the invention have been described and that numerous substitutions, modifications and alterations are permissible without departing from the spirit and scope of the invention as defined in the following claims.

I claim:

1. A method of removing at least 85% of organic contamination from particles of soil containing at least 5% of a fine particle fraction having a particle size below 70 microns comprising the steps of:

contacting the soil with an aqueous media including an anionic surfactant containing micelles formed by sonicating an aqueous suspension of a heavy hydrocarbon containing polar substitutents in the presence of an alkali metal salt, a substantial portion of the micelles having a size below 70 microns;

removing at least 85% of the contaminant from the particles of soil;

transferring a substantial portion of the contaminant removed from the soil particles to the media; and removing the media from the soil.

2. A method according to claim 1 in which at least 30% of the micelles have a size below 70 microns.

3. A method according to claim 2 in which the contaminant is a heavy hydrocarbon or a halogenated hydrocarbon.

4. A method according to claim 3 in which the contaminant is selected from crude oil, heating oil, Diesel Fuel and chlorinated aromatic compounds.

5. A method according to claim 4 in which said chlorinated aromatic compound contains from 2 to 20 phenyl rings and from 4 to 100 chlorine atoms.

6. A method according to claim 5 in which the contaminant is a polychlorinated biphenyl.

7. A method according to claim 1 in which the polar substituted compounds are $C_{12}$ to $C_{24}$ carboxylic acids.

8. A method according to claim 7 in which the metal salt is selected from an alkali metal silicate, carbonate or phosphate.

9. A method according to claim 8 in which the alkali metal compound is sodium silicate.

10. A method according to claim 9 in which the heavy hydrocarbon is tar sand.

11. A method according to claim 10 in which the source of said heavy hydrocarbon is the contaminant in said soil.

12. A method according to claim 1 in which the surfactant further includes from $10^{-4}$ to 1 percent by weight of a free radical generating agent.

13. A method according to claim 12 in which said agent is selected from peroxide and azo compounds.

14. A method according to claim 13 in which the agent is benzoyl peroxide or hydrogen peroxide.

15. A method according to claim 1 further including the step of separating large particles having a size above 1 mm from the soil.

16. A method according to claim 1 further including the step of excavating the contaminated soil from the site to form an excavation.

17. A method according to claim 16 further including the step of returning the clean soil to said excavation.

18. A method according to claim 1 in which a suspension of the soil in aqueous media containing the surfactant is formed and further including the step of sonicating said suspension.

19. A method according to claim 1 in which said aqueous media is flushed through said soil.

20. A method according to claim 19 in which the flushing of the soil occurs in situ in the ground.

21. A method according to claim 1 in which the fine particle fraction of the soil comprises 20–40% of the soil.

* * * * *